United States Patent [19]

Yoda

[11] Patent Number: 4,979,158

[45] Date of Patent: Dec. 18, 1990

[54] BIAS MAGNETIC FIELD ABNORMALITY DETECTING APPARATUS WHICH CONTROLS RECORDING AND ERASING OF INFORMATION

[75] Inventor: Yoshiro Yoda, Tama, Japan

[73] Assignee: Olympus Optical Co., Ltd., Tokyo, Japan

[21] Appl. No.: 161,590

[22] Filed: Feb. 29, 1988

[30] Foreign Application Priority Data

Mar. 3, 1987 [JP] Japan .................. 62-048370

[51] Int. Cl.⁵ .................. G11B 11/12; G11B 13/04
[52] U.S. Cl. .................. 369/013; 360/114; 360/59
[58] Field of Search .............. 369/13, 54, 58; 360/59, 360/114; 365/122

[56] References Cited

U.S. PATENT DOCUMENTS

| | | | |
|---|---|---|---|
| 4,712,203 | 12/1987 | Saito et al. | 369/13 |
| 4,733,385 | 3/1988 | Henmi | 360/114 |
| 4,748,606 | 5/1988 | Naito et al. | 369/13 |

FOREIGN PATENT DOCUMENTS 59-48803  3/1984  Japan .
59-84355  5/1984  Japan .
59-203258 11/1984  Japan .

*Primary Examiner*—Stuart S. Levy
*Assistant Examiner*—Hoa Nguyen
*Attorney, Agent, or Firm*—Armstrong, Nikaido, Marmelstein, Kubovcik & Murray

[57] ABSTRACT

The bias magnetic field abnormality detecting apparatus is used in a photomagnetic recording and reproducing apparatus for recording information on a recording medium or for reproducing and erasing the information from the recording medium and is provided with a field magnetic coil generating a magnetic field in the reverse direction at the time of recording and erasing information but generating no magnetic field at the time of reproducing information. A magnetic field detecting circuit detects the polarity of at least the magnetic field of the field magnetic coil and detects whether the magnetic field is abnormal or not. A writing in protecting circuit prohibits the recording and erasing operations by the output of the magnetic field detecting circuit.

7 Claims, 8 Drawing Sheets

BIAS MAGNETIC FIELD ABNORMALITY DETECTING APPARATUS WHICH CONTROLS RECORDING AND ERASING OF INFORMATION

FIELD OF THE INVENTION

This invention relates to a bias magnetic field abnormality detecting apparatus for detecting an abnormality of a bias magnetic field used for recording and erasing signals in a photomagnetic signal detecting apparatus wherein a polarized light is radiated onto a magnetic recording medium surface having recorded information and the rotation of the polarized surface, by the magnetic Kerr effect of its reflected light, is optically read out to detect information.

BACKGROUND OF THE INVENTION

Recently, there has come to be practiced an optical information recording and reproducing apparatus wherein information can be recorded by radiating a condensed light beam instead of using a magnetic head. The information recorded in a recording medium can be reproduced by receiving the returning light of the light beam condensed and radiated onto the recording medium.

In an apparatus utilizing a photomagnetic phenomenon in the above mentioned optical information recording and reproducing apparatus, the same as in the magnetic system recording and reproducing apparatus (magnetic disk apparatus), the recorded information can be erased and information can be written in again. Therefore, such an apparatus is expected to be extensively used hereafter as an external storage apparatus of a computer.

Now, the conventional photomagnetic recording and reproducing apparatus is of a formation as is shown, for example, in FIG. 1.

A photomagnetic disc 1 is rotated and driven by a spindle motor 2, a light pickup 3 is arranged as opposed to one surface of this disc 1 and a field magnetic coil 4 is arranged as opposed also to the other surface of this disc 1 so that a magnetic field may be applied to the photomagnetic disc 1 part on which the light is condensed and radiated by the light pickup 3 to be able to not only reproduce when there is no need for the magnetic field) but also to record and to erase.

The above mentioned light pickup 3 is controlled for reproducing, recording and erasing by a controller 5.

For example, in the reproducing mode, the controller 5 feeds a comparatively weak constant current corresponding to the reproducing (reading) mode to a light emitting source such as a semiconductor laser (not illustrated) of the light pickup 3 through a constant current circuit 6. The information data read out by the laser light under this constant current is transmitted to the controller 5.

On the other hand, in the recording mode and erasing mode, it is necessary to apply a magnetic field. Therefore, the controller 5 feeds a magnetic field generating current to the field magnetic coil 4 through the constant current circuit 7.

In the above mentioned recording mode and erasing mode, it is necessary to reverse the direction of the magnetic field. Therefore, the controller 5 controls the currents directed reversely to each other to flow through a field magnetic coil 4 in the recording mode and erasing mode.

In the above mentioned photomagnetic recording and reproducing apparatus, in order to prevent the size of magnetic field, applied to the disc 1 by the field magnetic coil 4 based on the, vertical movement of the rotated and driven disc 1, from fluctuating so that recording or erasing can not be positively made, a vertically movable auxiliary magnetic field generating apparatus is provided according to the gazette of a Japanese patent application laid open No. 48803/1984. In this prior art example, the difference between the reference voltage and the level of the detected magnetic field is detected and the auxiliary magnetic field is controlled with the differential output to be held on a predetermined magnetic field level.

Further, in the gazette of a Japanese patent application laid open No. 203258/1984, reflected light of equal light amount will enter respectively the two light receiving surfaces of a two-divided light detector 22 as an information detecting means in case the disc is in a predetermined position and the light amount entering the respective light receiving surfaces will vary in case the disc moves vertically so that the magnetic field level may be controlled from this variation amount and the magnetic field intensity in the recording medium may be kept constant.

The above mentioned prior art example will have no problem when the polarity of the magnetic field detected by the magnetic field detecting means is correct but can not detect even an abnormal state, due to a break of the field magnetic coil or the rare shorting of the insulating member between coils by a defective insulation, when no normal magnetic field is obtained.

Also, when the direction of the current flowing through the magnetic field coil is not normal at the time of a recording or erasing mode, the difference from the reference voltage will be the value of an actual addition and the bias magnetic field can not be normally applied. Therefore, recording or erasing can not be positively made.

Further, the above mentioned prior art example is to keep the magnetic field intensity in the recording medium constant and does not concretely describe a means whereby an abnormality of the magnetism can be detected and a means of prohibiting the recording and erasing operation in case an abnormality of the magnetism is detected.

OBJECT AND SUMMARY OF THE INVENTION

An object of the present invention is to provide a bias magnetic field abnormality detecting apparatus whereby whether the magnetic field is suitably applied to the recording medium in recording and erasing modes or not can be detected and the recording and erasing of information can be controlled.

The bias magnetic field abnormality detecting apparatus of the present invention is used for a photomagnetic record reproducing apparatus for recording information on a recording medium or reproducing or erasing the information from the above mentioned recording medium.

This bias magnetic field abnormality detecting apparatus comprises a magnetic field generating devices, provided near the above mentioned recording medium, which generates a reverse direction magnetic field at the time of recording and erasing information but the magnetic field generating device generates no magnetic field at the time of reproducing information A magnetic field abnormality sensing device detects at least the polarity of the magnetic field of the above mentioned magnetic field generating device, and detects whether the magnetic field is abnormal or not. A recording and erasing prohibiting device prohibits the recording and erasing operations by the output of the above mentioned magnetic field abnormality sensing device.

The other features and advantages of the present invention will become apparent with the following explanation.

BRIEF DESCRIPTION OF THE DRAWINGS

FIG. 2 is an explanatory view showing the formation of a bias magnetic field abnormality detecting apparatus in the first embodiment.

FIG. 3 is a formation view of a photomagnetic recording and reproducing apparatus provided with the first embodiment.

FIG. 4(a-h) is a timing chart diagram for explaining the operation of the first embodiment.

FIG. 7 is a formation diagram of a photomagnetic recording and reproducing apparatus provided with the fourth embodiment.

FIG. 8 is an elevation showing the form of a permanent magnet in the fourth embodiment.

DETAILED DESCRIPTION OF PREFERRED EMBODIMENTS

The present invention shall be explained in the following with reference to the drawings.

Figure 1:
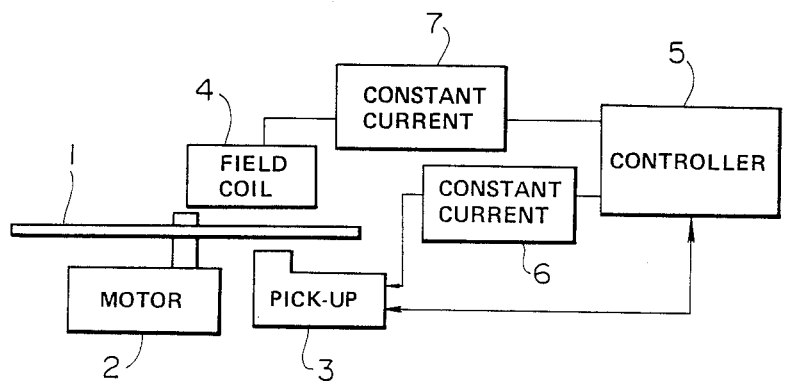
FIG. 1 is a formation view of a photomagnetic recording and reproducing apparatus of a prior art example.
Figure 2:
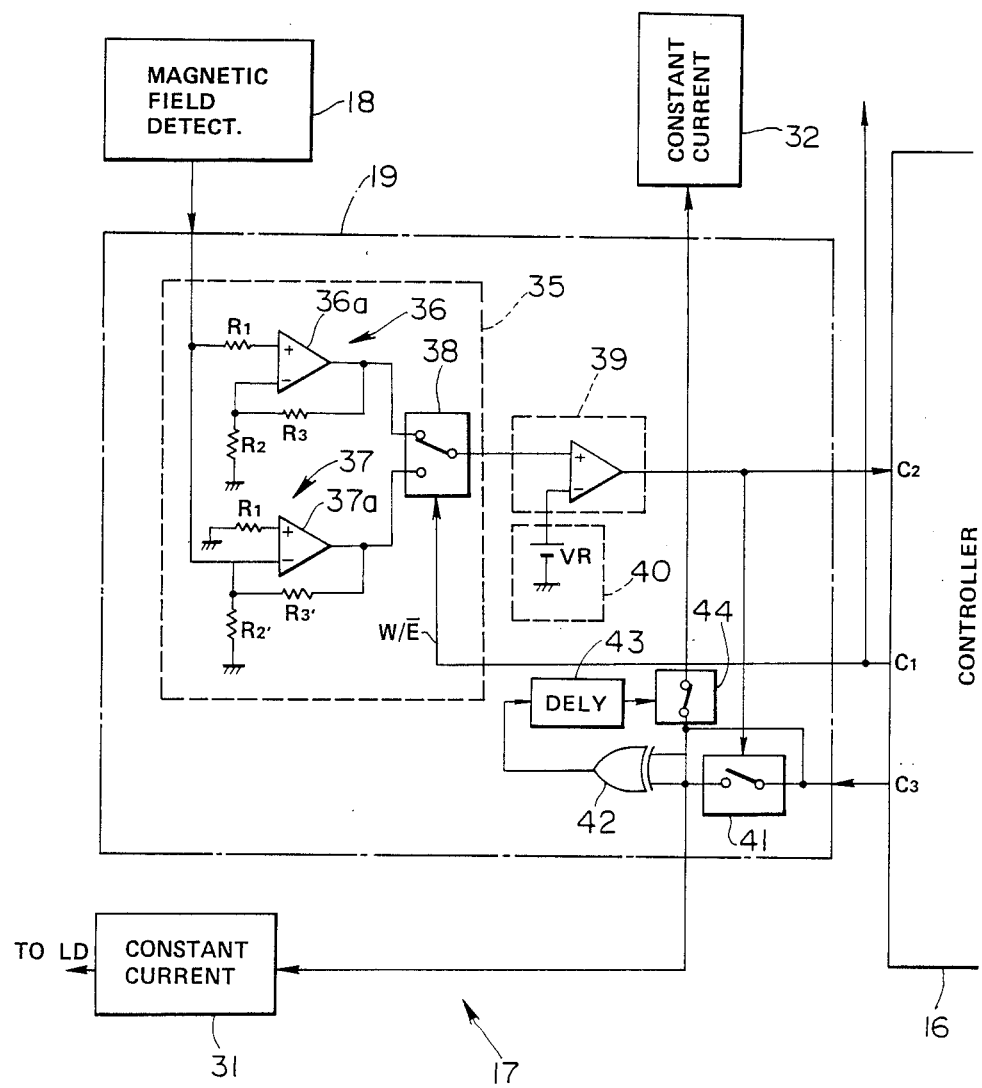
FIGS. 2 to 4 relate to the first embodiment of the present invention.
Figure 3:
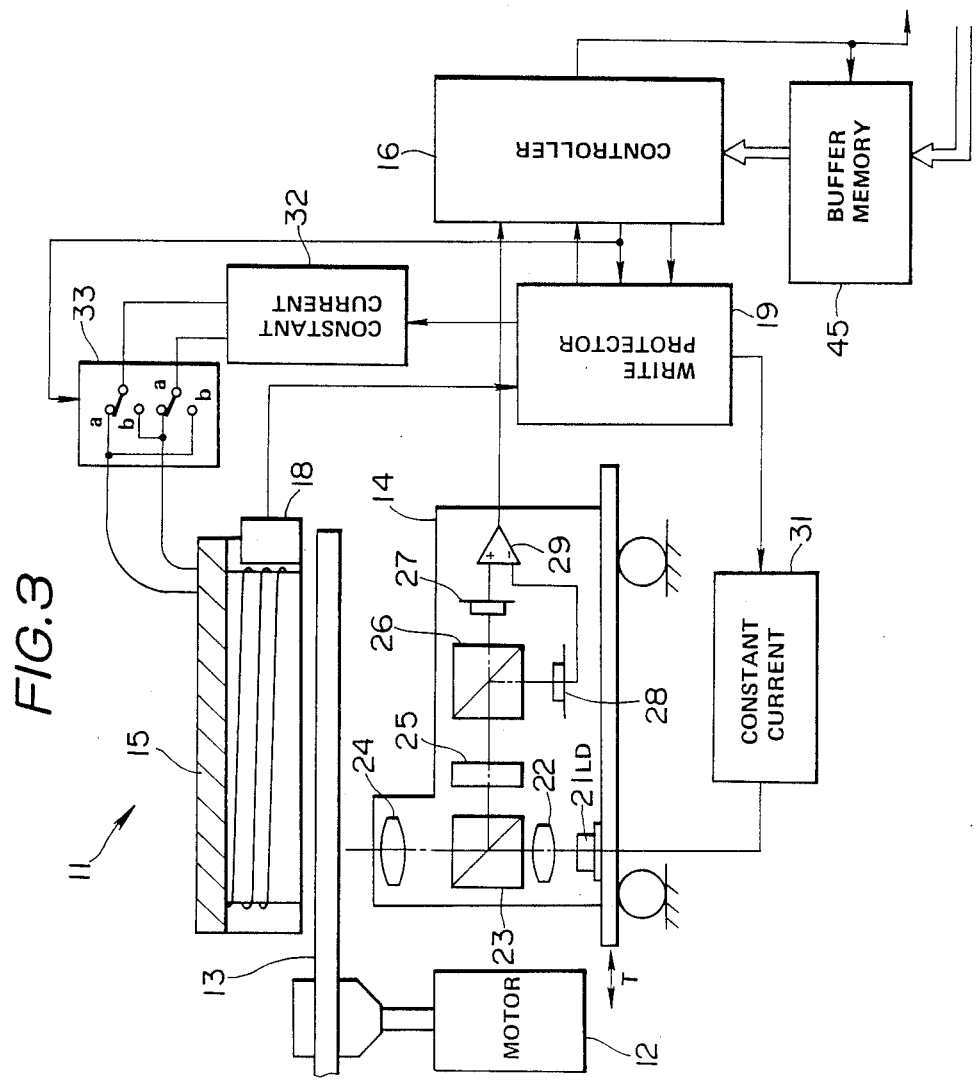
Figure 4:
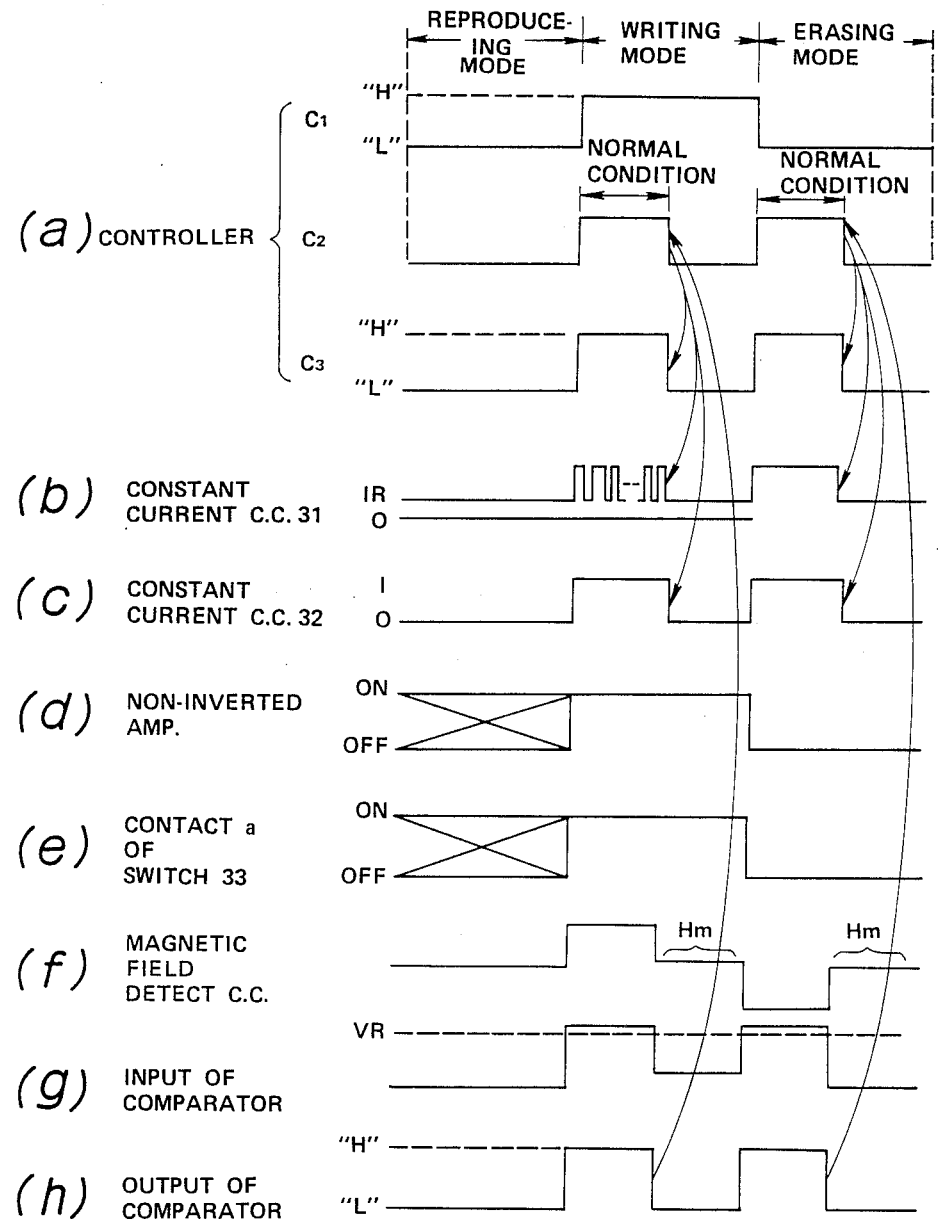

FIGS. 2 to 4 show the first embodiment of the present invention.

As shown in FIG. 3, in a photomagnetic recording and reproducing apparatus 11 provided with the first embodiment, a photomagnetic pickup 14 is arranged movably in the direction T crossing concentric circular (spiral) tracks of a disc 13. The pickup 14 is opposed to one surface of the photomagnetic disc 13 which is rotated and driven by a spindle motor 12.

A field magnetic coil 15, for applying a bias magnetic field, is arranged so as to be opposed to the (photomagnetic) pickup 14 on the other surface of the above mentioned disc 13.

The above mentioned pickup 14 is controlled in its operation by a controller 16 but is controlled in the operation at least in the erasing and recording modes through a bias magnetic field abnormality detecting apparatus 17 of the first embodiment shown in FIG. 2.

The above mentioned bias magnetic field abnormality detecting apparatus 17 is formed of a magnetic detecting circuit 18 and a writing in protecting circuit 19 detecting whether the output level of the circuit 18 is abnormal or not and prohibiting the erasing and recording operations when the output level is abnormal.

The above mentioned pickup 14 has a laser diode (LD) 21 as a light source for recording, reproducing and erasing information as shown in FIG. 3. For example, a P-polarized light beam of the laser diode 21 has a dispersive light beam converted into a parallel light beam by a collimator lens 22. The parallel light beam passes through a half prism 23 and is condensed and radiated on the recording surface of the disc 13 by an objective lens 24. The returning light reflected by this disc 13 passes through the objective lens 24, is partly reflected by the half prism 23, is rotated by about 45 degrees on the polarized surface by a ½ wavelength plate 25 and is then branched into a transmitted light and reflected light by a polarized beam splitter 26.

The transmitted light and reflected light branched by the above mentioned polarized beam splitter 26 are received respectively by photodetectors 27 and 28, the photoelectric conversion outputs of these light detectors 27 and 28 are input into a differential amplifier 29 and its differential output is output on the controller 16 side. This differential output is a signal corresponding to the information data recorded on the disc 13.

The added output (not illustrated) of the above mentioned two photodetectors 27 and 28 is also input into the controller 16. This added output is a recording region discriminating information of a track address or sector address. Whether an access to a target position is made or not can be discriminated by reading out this information. Thereafter, the information can be read, out of the data part or can be recorded in the data part which has not yet been recorded or the data in the recorded data part can be erased.

The above mentioned pickup 14 is controlled so that the objective lens 24 may be held by a tracking actuator (not illustrated) in a tracking state in which the spot position of the light beam is made to follow the target track or the light beam condensed and radiated on the disc 13 by a focusing actuator may be held in a focused state.

The laser diode 21 within the above mentioned pickup 14 can be set at a reading mode current corresponding to a reading light emitting power through a constant current circuit 31 and at a writing and erasing light emitting current several times larger than this reading mode current.

The above mentioned constant current circuit 31 is controlled in switching the writing and erasing light emitting current on and off output of the writing protecting circuit 19. That is to say, the data writing (that is, the recording operation) and the data erasing (that is, the erasing operation) can be prohibited.

The controller 16 feeds a constant current to the field magnetic coil 15 through the writing protecting circuit 19 and constant current circuit 32 at the time of the recording mode and erasing mode and applies a predetermined bias magnetic field to the disc 13. This bias magnetic field can invert the direction of the fed current by a switch 33 which is controlled by the controller 16 so that, for example, in the recording mode, the contact a side shown in FIG. 3 may be selected and, in the erasing mode, the other contact b side may be selected.

Now, the formation of the above mentioned writing in protecting circuit 19 is shown in FIG. 2.

The output of a magnetic field detecting circuit 18 which is fitted to a field magnetic coil 15 such as a hall device or sensing coil and, detects the size of the magnetic field including the magnetism of the field magnetic coil 15 (Shown in FIG. 3). The result of the detection is input into an amplifier 35 comprising a non-inverted amplifier 36 an inverted amplifier 37 and an analogue switch 38 switching the outputs of both of these amplifiers 36 and 38. The non-inverted amplifier 36 is connected at the signal input end to the non-inverted input end of an operation amplifier (mentioned as the OP amplifier hereinafter) 36a through a resistance R1. The inverted input end of this OP amplifier 36a is grounded through a resistance R2 and is connected to the output end of the OP amplifier 36a through a resistance R3. The amplification rate of this non-inverted amplifier 36 is determined by the resistances R2 and R3 and its value is (R2+R3)/R2.

On the other hand, in the inverted amplifier 37, the signal is input into the inverted input end of the OP amplifier 36a and the other formations are the same as in the non-inverted amplifier 36 but the values of resistances R2' and R3' corresponding to the resistances R2 and R3 are made (R2+R3)/R2 R3'/R2' and the absolute value of the amplification rate is equal in both amplifiers 36 and 37. The above mentioned analogue switch 38 is controlled in switching by a recording/erasing controlling signal (W/E signal) output from the terminal C1 of the controller 16. That is to say, for example, if the non-inverted amplifier 36 side is selected at the time of the recording mode, the inverted amplifier 37 side will be selected at the time of the erasing mode.

The output of the above mentioned amplifier 35 is input into a comparator 39, is compared by this comparator 39 with a reference voltage VR of a reference voltage source 40. This compared output is input from the terminal C2 of the controller 16 and is applied to the on-off controlling end of this analogue switch 41. When the absolute value of this compared output exceeds the reference voltage VR, the compared output will become "H". On the other hand, when the absolute value does not exceed the reference voltage VR, the compared output will be held "L". The above mentioned analogue switch 41 is interposed in an instruction signal line (output from the terminal C3) giving a recording or erasing instruction to constant voltage circuits 31 and 32 from the controller 16. When this line becomes off, the constant current circuit 31 will not be able to feed a current to the laser diode 21 above the current value corresponding to the light emitting power at the time of the reproducing mode.

That is to say, in the laser diode 21, a large light emitting state in which the recording operation or erasing operation can be made can not be reached. In this light emitting state, the magnetic body forming the recording layer of the disc 13 will not be heated near or above the Curie point. Therefore, even if a normal bias magnetic field is applied, recording or erasing will not be made. That is to say, the writing in protecting state or, in other words, the recording and erasing prohibiting state will be held.

In this embodiment, if the analogue switch 41 is off in the recording or erasing mode, the current fed by the other constant current circuit 32 will also be off.

That is to say, the contact state of the analogue switch 41 is detected to be on or off by an exclusive logical sum circuit (EX-OR circuit) 42. When the terminal C3 is in "H" (that is, the recording or erasing mode) and the switch 41 is off, the output of the EX-OR circuit 42 will become "H" and will be delayed by a minute time by the delaying device 43, then the switch 44 in series with the constant current circuit 32 will be switched off and the feed of the bias current to the field magnetic coil 15 will be cut. (The constant current circuits 31 and 32 are not controlled to be simultaneously on and off, because it is necessary to detect the magnetic field in case the current is made to flow by the constant current circuit 32 and then to determine whether the magnetic field is normal or not.)

By such a formation, the bias current, which is useless in the writing in protecting state, is cut. Also, by generating no bias magnetic field, the recording and erasing can be more positively prohibited in the writing in protecting state to improve reliability.

In the writing in protecting state, the controller 16 stops taking in the data input through the buffer memory 45. For example, a signal is sent to a buffer memory 45 to stop the transfer of data to the controller 16 and is sent to the buffer memory 45 to stop the operation of transferring data to the data source side transmitting the data.

The operation of the thus formed first embodiment shall be explained in the following.

First of all, in the reproducing mode, the terminal C3 of the controller 16 is "L", that is, it is neither in the recording mode nor in the erasing mode. Therefore, though the switch 41 is on or off, the constant current circuit 31 will be held at a current value IR in the reproducing mode (no large current state will be made in the recording mode and erasing mode) and the other constant current 32 will be held in an off state. This manner is shown in FIG. 4.

On the other hand, in the recording mode, the controller 16 outputs from the terminal C3 a signal of "H" becoming a recording or erasing instructing signal and places the terminal C1 in the recording mode state, that is, H. When this terminal C1 is "H", the amplifier 35 will have the non-inverted amplifier 36 selected (This is represented as the non-inverted amplifier ON in FIG. 4 (d)) and the switch 33 will have the recording mode side contact a selected (the contact a is mentioned to be ON). When the above mentioned terminal C3 is "H", an instruction to feed a bias current I toward the field magnetic coil 15 for the constant current circuit 32 through the switch 44 is made and a bias magnetic field is applied to the disc 13 through the contact a of the switch 33. When the above mentioned terminal C3 becomes "H", the controller 16 will have the detecting signal of the magnetic field detecting circuit 18 input through the writing in protecting circuit 19, the output of the magnetic field detecting circuit 18 will be applied to the non-inverted input end of the comparator 39 through the non-inverted amplifier 36 in the recording mode and this input level will be compared with the reference voltage VR. In the normal magnetic field applying state, this input level will exceed the level of the reference voltage VR as shown in FIG. 4(g). Therefore, in the normal state, the output of the comparator 39 will become "H". Therefore, the controller 16 will take in the output of the comparator 39 from the terminal C2, will confirm that the magnetism of the magnetic field in the recording mode is normal and will continue the recording operation. When the output of this comparator 39 is "H", the switch 41 will be held on, the constant current circuit 31 will be set at the light emitting power in response to the recorded data and the recording of the data will be continued.

On the other hand, for example, in case the winding of the field magnetic coil 15 is broken or short-circuited and no magnetic field or only a small magnetic field is generated (this state is shown by Hm in FIG. 4(f)) or in case the magnetic field is applied with a reverse polarity, the input level to the comparator 39 will be small (There is a case of becoming a negative polarity.) Therefore, the output of the comparator 39 will become "L" as shown in FIG. 4(h). When the output of this comparator 39 becomes "L", the switch 41 will be off and the constant current circuit 31 will be held so that the light emission in the light emitting power may be prohibited, that is to say, so that the writing in may be protected. When the above mentioned switch 41 is off, the output of the EX-OR circuit 42 will become "H", the switch 44 will be off through the delay device 43, the feed of the current to the field magnetic coil 15 will be stopped and the writing in protecting state will be positively held.

When the above mentioned terminal C2 becomes "L", the controller 16 will stop taking in the recording data from the buffer memory 44, will send a signal to the data source side transferring data to the buffer memory 44 and will stop transferring data.

The erasing mode shall be explained in the following. The controller 16 makes the terminal C3 "H" and terminal C1 "L". When the terminal C1 becomes "L", the amplifier 35 will be selected on the inverted amplifier 37 side, the switch 33 will be selected to the b side and a current in the direction reverse to the recording mode will flow through the field magnetic coil 15. When a bias magnetic field is normally generated by the field magnetic coil 15, the direction of the magnetic field will be reverse to the time of the recording mode. This bias magnetic field will be detected by the magnetic field detecting circuit 18, will be inverted through the inverting amplifier 37 and will be input into the comparator 39. Therefore, if in the normal state, the output of the comparator 39 will become "H", the switches 41 and 44 remain on and the erasing will be continued.

On the other hand, if the magnetic field is not normally generated or the polarity of the magnetic field is not normal, the output of the comparator 39 will become "L", the switch 41 will be off, the erasing light emitting state will not be reached, this switch 41 will be off, the switch 44 will be also off, the generation of the bias magnetic field will also stop and the erasing operation prohibiting writing in protecting state will be held.

According to the thus operating first embodiment, the magnetic field actually applied to the disc 13 is detected as including the magnetic field, the recording and erasing operations will be continued only in the case of a normal magnetic field applied state and the recording and erasing operations will be prohibited in case an abnormality is detected.

Therefore, according to the recording and reproducing apparatus using this embodiment, data can be positively recorded or erased by the operation in the recording or erasing mode and the reliability of the apparatus can be improved. Also, precious data can be prevented from being erased.

Figure 5:
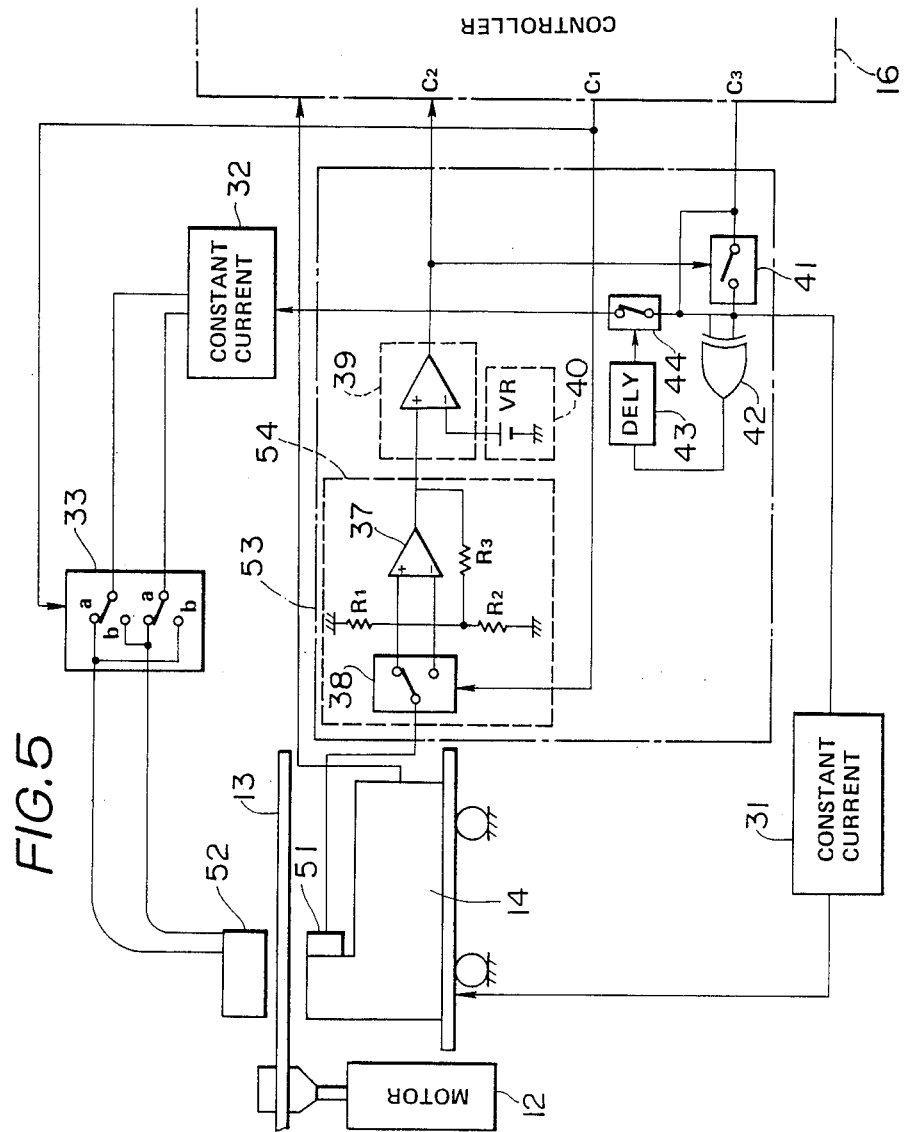
FIG. 5 is a formation diagram of a photomagnetic recording and reproducing apparatus showing the second embodiment of the present invention.

FIG. 5 shows an essential part of the second embodiment of the present invention.

In this embodiment, a magnetic field detecting circuit 51 is fitted near an objective lens of the pickup 14 arranged as opposed to a field magnetic coil 52 with respect to the disc 13.

In this embodiment, the field magnetic coil 52 is moved while retaining the opposed position with the movement in the radial direction of the pickup 14.

By the above mentioned magnetic field detecting circuit 51, it can be detected that, when the field magnetic coil 52 is not in a normal position for the disc 13, (even if the field magnetic coil 52 generates a normal magnetic field), no normal magnetic field will be applied to the disc 13.

Also, in this embodiment, in the writing in protecting circuit 53, the amplifier 35 shown in FIG. 2 is formed of an amplifier 54 using a signal OP amplifier 37. That is to say, the output of the magnetic field detecting circuit 51 can be applied to the non-inverted or inverted input end of the OP amplifier 37 through the switch 38 and the amplifier operates as a non-inverted or inverted amplifier in response to the contact switched on by the switch 38.

The others are of the same formation as of the above mentioned first embodiment and the operation is also substantially the same.

Figure 6:
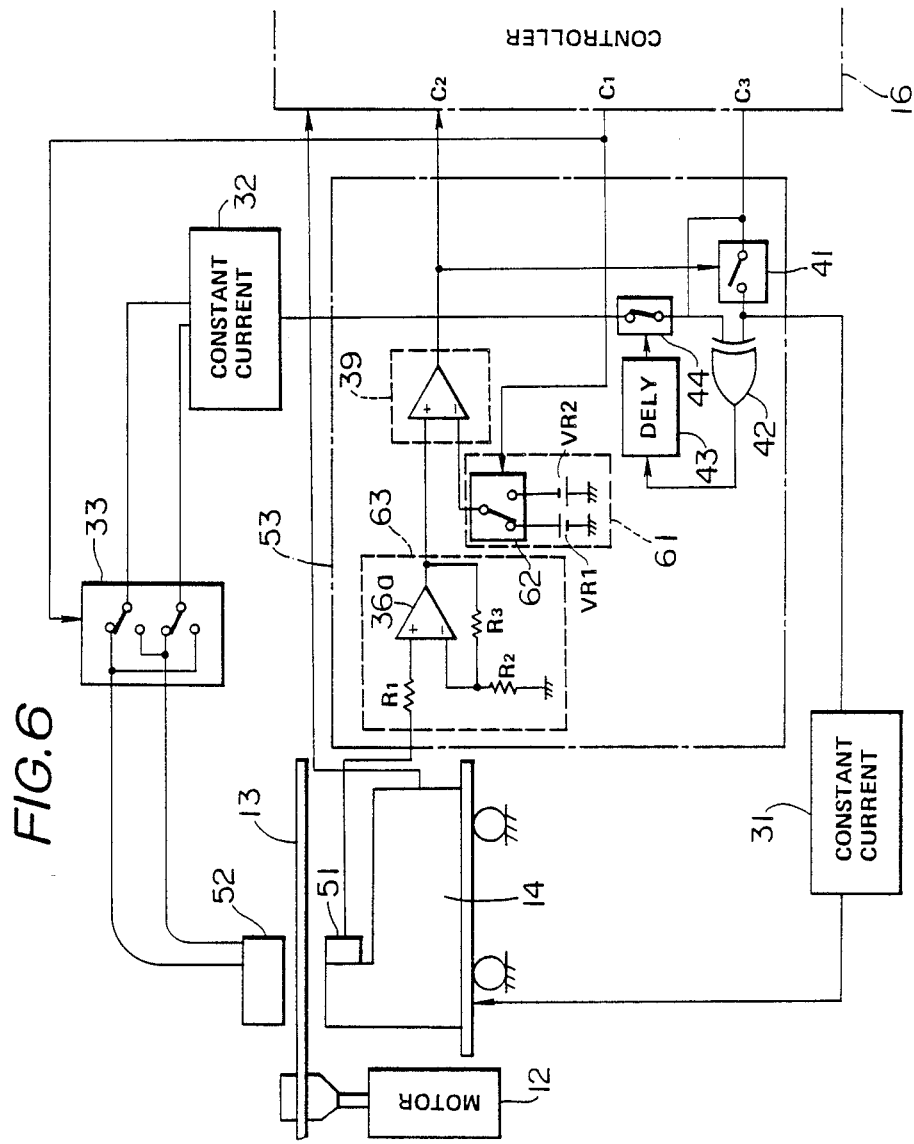
FIG. 6 is a formation diagram of a photomagnetic recording and reproducing apparatus showing the third embodiment of the present invention.

FIG. 6 shows an essential part of the third embodiment of the present invention.

In this embodiment, the controller 16 in the formation shown, for example, in FIG. 2 or 5 controls switching the reference voltages VR1 and VR2 of the reference voltage source 61 instead of controlling switching the switch 38 with the output of the terminal C1. That is to say, in the recording mode, the switch 62 is selected to switch on the reference voltage VR1 side. On the other hand, in the erasing mode, it is selected to switch on the reference voltage VR2 of the reverse polarity. Thereby, in the erasing and recording operations, the level of the bias magnetic field of the field magnetic coil 52 is set to be of a different value and the case of operating under more desirable operating conditions (the case that the magnetic field generated by the field magnetic coil is different between erasing and recording) can be properly coped with. The output of the magnetic field detecting circuit 51 is input into an amplifier 63 operating as a non-inverted amplifier.

In the above described respective embodiments, at the time of protecting writing in, not only the light emitting power to the laser diode 21 is not made to be above the reading mode but also the generation of the bias magnetic field is stopped. However, in some cases, it may be enough only to make the light emitting power to the laser diode 21 not to be above about the reading power.

Figure 7:
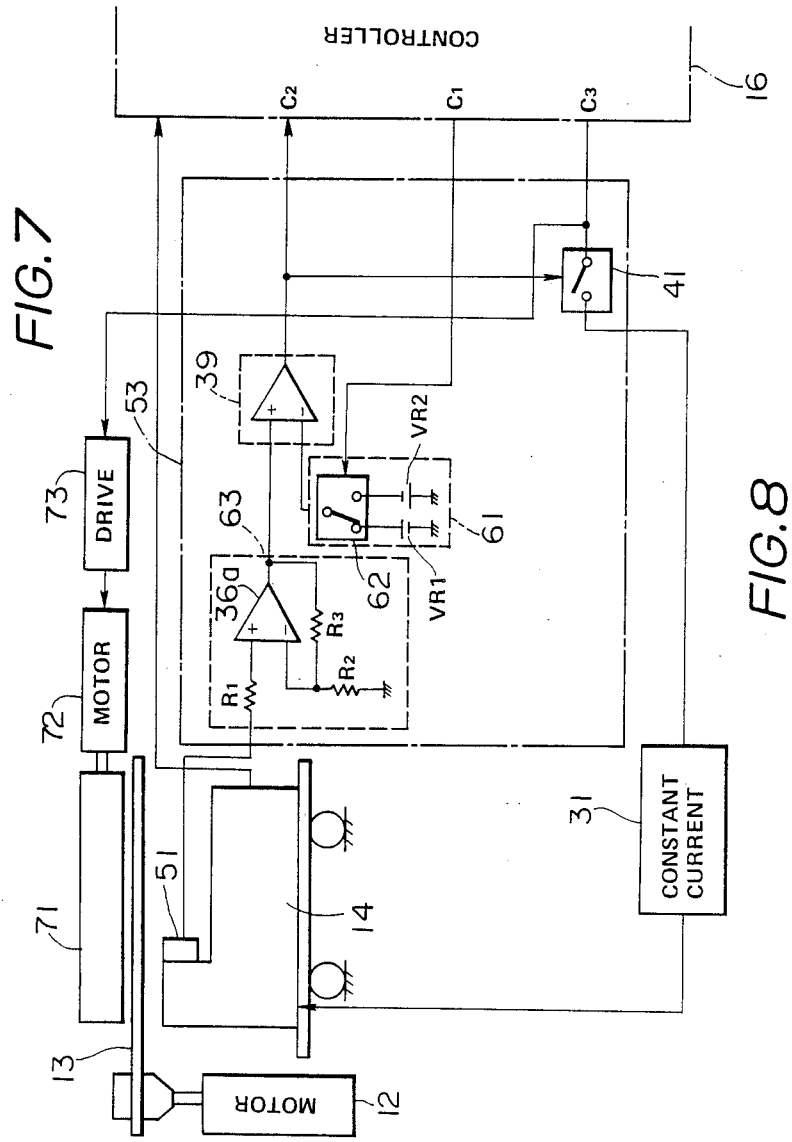
FIGS. 7 and 8 relate to the fourth embodiment of the present invention.

In the above described respective embodiments, the field magnetic coil is used. However, the present invention can be applied not only to the embodiment using the field magnetic coil but also to such embodiment using a permanent magnet as the fourth embodiment shown in FIG. 7. In this embodiment, a permanent magnet 71 is used as a bias magnetic field applying means and is made rotatable by a proper angle, for example, by a motor 72 which is driven through a driving circuit 73 by the output, for example, of the terminal C2 of the controller 16.

Figure 8:
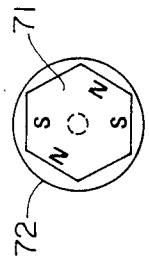

The permanent magnet 71 is in a form of a hexagonal slender bar has an N pole, S pole, non-polar part, formed in the peripheral direction of the magnet as shown, for example, in FIG. 8 and is controlled (through the motor 72) so that, in the reproducing mode, the non-polar part may be held to be opposed to the disc 13 and, in the erasing mode, when the permanent magnet is rotated by a proper angle (60m degrees in FIG. 8) to oppose the N pole (S pole), the S pole (N pole) will be opposed in the recording mode.

Even in this embodiment, only in case the magnetic field is correct, recording and erasing will be made and, if the magnetic field is not correctly applied, the recording and erasing operations will be prohibited.

Figure 9:
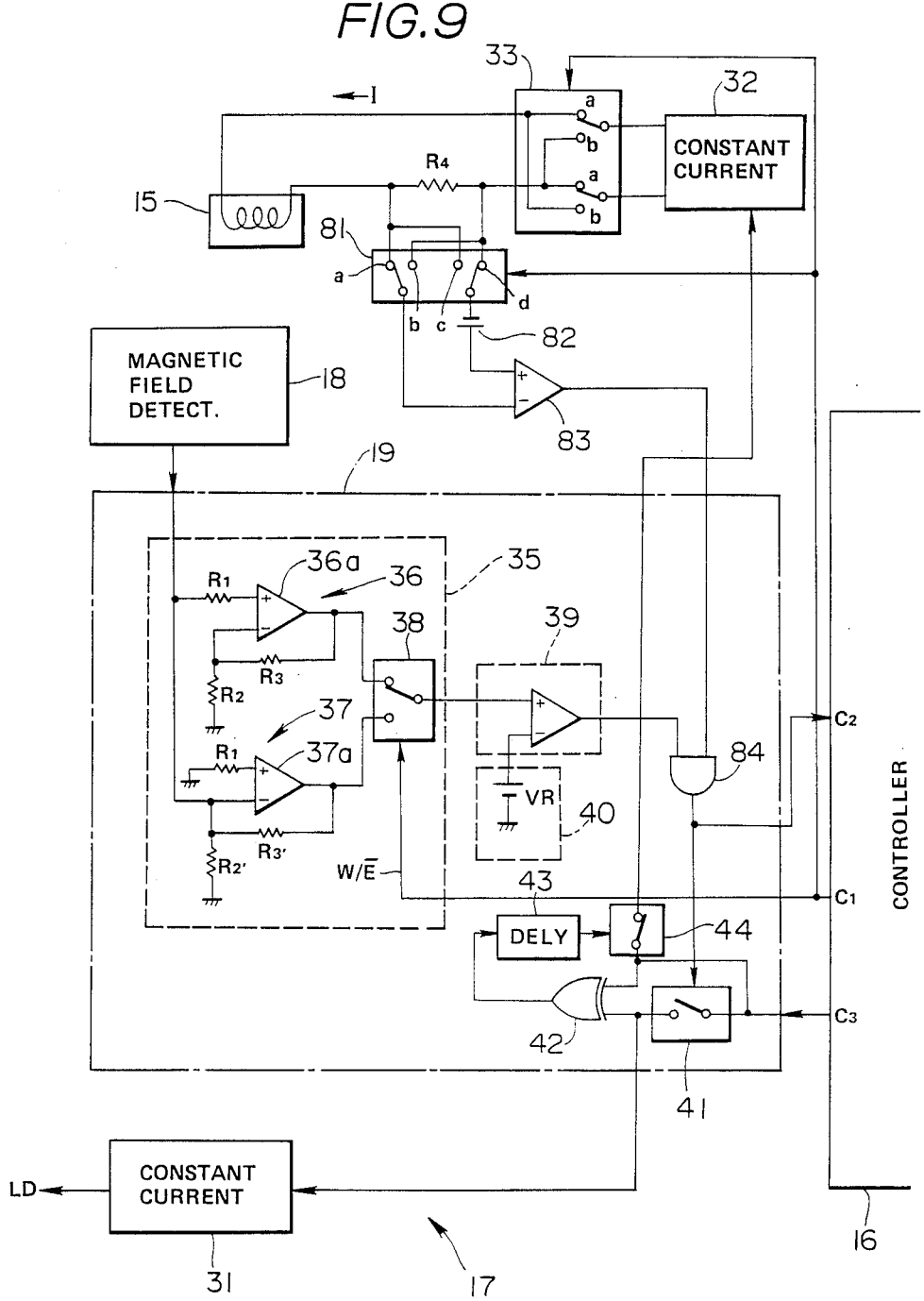
FIG. 9 relates to the fifth embodiment of the present invention and is an explanatory view showing the formation of a bias magnetic field abnormality detecting apparatus.

FIG. 9 shows an essential part of the fifth embodiment of the present invention. In this embodiment, in the formation shown, for example, in FIG. 2, in case an excess current flows through the field magnetic coil 15, writing in will be protected.

In FIG. 9, in the case of the recording mode, the controller 16 will output from the terminal C3 a signal of "H" to be a recording or erasing instructing signal and will make the terminal C1 in the recording mode state, that is, "H". This "H" is applied to switches 33 and 81. In the switch 33, the contact a is selected and, in the switch 81, the recording mode side contacts a and d are selected. When the above mentioned terminal C3 becomes "H", an instruction of feeding a bias current to the field magnet coil 15 will be made to the constant current circuit 32 through the switch 44 and the current will flow in the direction indicated by the arrow I. The constant current circuit 32 is to apply the bias current to the field magnetic coil 15 through the resistance R4 and to the ⊖input end of the comparator 83 through contact a of the switch 81 between the field magnetic coil 15 and resistance R4. The input ⊕terminal of this comparator 83 is connected between the resistance R4 and constant current circuit 32 through the direct current source 82 and contact d. If the bias current is normal, the output of the comparator 83 will become "H" and will be applied to the input end of the AND circuit 84. The output end of the comparator 39 is connected to the other input end of this AND circuit 84. This comparator 39 is to input "H" into the AND circuit 84 in the normal state. Therefore, in the AND circuit 84, in the normal state, "H" is applied to the switch 41 and terminal C2, the switch 41 is held in the on-state and the recording of data is continued.

On the other hand, for example, in case an excess current flows through the field magnetic coil 15, the output of the comparator 83 will become "L" which will be applied to the AND circuit 84. The AND circuit 84 outputs "L" to the switch 41 which is switched off. Thereby, the constant current circuit 31 will be prohibited from emitting a light in the light emitting power and will be held in the writing in protecting state.

Further, in the case of the erasing mode, the controller 16 makes the terminal C3 "H" and the terminal C1 "L". When the terminal C1 becomes "L", the switch 33 will select contact b and the switch 81 will select the erasing mode side contacts b and c. When the above mentioned terminal C3 becomes "H", an instruction to feed a bias current to the field magnetic coil 15 will be made to the constant current circuit 32 through the switch 44 and the current will flow in the direction reverse to the direction indicated by the arrow I.

If an excess current flows through the field magnetic coil 15, the output of the comparator 83 will become "L" which will be applied to the AND circuit 84. Then, the same as is mentioned above, the light emission in the erasing and emitting light power will be prohibited and an erasing operation prohibiting and writing in protecting state will be held.

According to the thus operating fifth embodiment, only in case the bias current flowing through the field magnetic coil 15 is normal, the recording and erasing operations will be continued and, in case the current becomes excess, the recording and erasing operations will be able to be prohibited.

An LED is connected through an inverter to the output end of the comparator 83 so that, in case an excess current flows, the LED may be lit to warn of the abnormality.

The others are of the same formation as in the first embodiment and the operation is also substantially the same.

In the above described respective embodiments, whether the level of the magnetic field is normal or not is determined on only a single level (the value of only the lower limit side considered to be of a normal value) but, by the formation by using a window comparator, whether or not the magnetic field level is within a predetermined range within the lower and upper limits considered to be of normal values can be determined.

In the respective embodiments, after it is determined that the direction of the magnetic field is correct in the recording mode and erasing mode, the actual recording or erasing may be made. Also, when operated in the recording and erasing modes, if the magnetic field is determined not to be normal, the recording and erasing will be able to be immediately stopped.

According to the above mentioned respective embodiments, as there is provided a means of detecting the polarity of the magnetic field applied to the disc at the time of the recording mode and erasing mode, a misoperation in recording or erasing with a polarity different from the normal polarity can be prevented.

In this invention, it is apparent that a wide range of different working modes can be formed on the basis of this invention without departing from the spirit and scope of the invention. This invention is not restricted by its specific working modes except being limited by the appended claims.

What is claimed is:

1. A bias magnetic field abnormality detecting apparatus to be used in a photomagnetic recording and reproducing apparatus which records information by a laser light emitted from a laser light source onto a recording medium having a magnetic optical effect and which reproduces or erases information from said recording medium, said bias magnetic field abnormality detecting apparatus comprising:

a magnetic field generating means, provided near said recording medium, for generating a magnetic field, a direction of said magnetic field during recording information is reverse from a direction of said magnetic field erasing information;

a magnetic field abnormality sensing means for detecting whether an operating state of said magnetic field generating means is abnormal for outputting a control signal, and said magnetic field abnormality sensing means is for detecting a size of the magnetic field including a polarity of a field magnetic coil; and a recording and erasing prohibiting means for prohibiting recording and erasing operations of the photomagnetic recording and reproducing apparatus based on the control signal of said magnetic field abnormality sensing means.

2. A bias magnetic field abnormality detecting apparatus according to claim 1 wherein said recording and erasing prohibiting means for controlling the current supplied to said laser light source, for making said laser light source radiating and for stopping writing in data to said recording medium.

3. A bias magnetic field abnormality detecting apparatus according to claim 1 wherein said magnetic field generating means is a field magnetic coil.

4. A bias magnetic field abnormality detecting apparatus according to claim 1 wherein said magnetic field generating means is a permanent magnet.

5. A bias magnetic field abnormality detecting apparatus according to claim 4 wherein said permanent magnet is in the form of a hexagonal slender bar with an N pole, an S pole and a non-polar part provided in an alternative arrangement with respect to each other in the peripheral direction of an outer surface of said hexagonal slender bar for recording, erasing and regenerating said recording medium in said peripheral direction respectively.

6. A bias magnetic field abnormality detecting apparatus to be used in a photomagnetic recording and reproducing apparatus which records information by a laser light emitted from a laser light source onto a recording medium having a magnetic optical effect and which reproduces or erases information from said recording medium, said bias magnetic field abnormality detecting apparatus comprising:

magnetic field generating means, provided near said recording medium, for generating a magnetic field, a direction of said magnetic field during recording information is reverse from a direction of said magnetic field during erasing information;

a magnetic field abnormality sensing means for detecting whether an operating state of said magnetic field generating means is abnormal for outputting a control signal, and said magnetic field abnormality sensing means for sensing an excess current flowing through the magnetic field generating means; and a recording and erasing prohibiting means for prohibiting recording and erasing operations of the photomagnetic recording and reproducing apparatus based on the control signal of said magnetic field abnormality sensing means.

7. A bias magnetic field abnormality detecting apparatus according to claim 6 wherein said recording and erasing prohibiting means for controlling the current supplied to said laser light source, for making said laser light source radiating and for stopping writing in data to said recording medium.

* * * * *